United States Patent [19]

Beigbeder et al.

[11] Patent Number: 5,257,536

[45] Date of Patent: Nov. 2, 1993

[54] AIRCRAFT PROBE FOR MEASURING AERODYNAMIC PARAMETERS OF AMBIENT FLOW

[75] Inventors: Gérard Beigbeder, Paris; Henri Leblond, Versailles, both of France

[73] Assignee: Sextant Avionique, France

[21] Appl. No.: 739,810

[22] Filed: Aug. 2, 1991

[30] Foreign Application Priority Data

Aug. 3, 1990 [FR] France .................. 90 09956

[51] Int. Cl.$^5$ ............................................ G01D 21/00
[52] U.S. Cl. .................................... 73/180; 73/170.02
[58] Field of Search ................. 73/180, 188, 189, 147, 73/182

[56] References Cited

U.S. PATENT DOCUMENTS 3,069,906 12/1962 Eiland, Jr. ................ 73/188
3,699,811 11/1972 Maiden et al. ............ 73/189
4,972,846 6/1987 Leblond .................... 73/180

FOREIGN PATENT DOCUMENTS 176405 4/1986 European Pat. Off. .
2323137 4/1977 France .
1181669 2/1970 United Kingdom .

*Primary Examiner*—Donald O. Woodiel
*Attorney, Agent, or Firm*—Rosenman & Colin

[57] ABSTRACT

The probe comprises a wind vane (1) mounted for rotation on the aircraft in order to orient itself in the direction of the flow and provided with a detector (15) for detection of differential pressure representative of the aerodynamic angle of incidence of the wind vane, and a device for determining the orientation of the wind vane with respect to the aircraft. The probe comprises a control loop (14) adapted to cancel out the aerodynamic angle of incidence of the wind vane and controlled by the detector (15). The probe supplies the true angle of incidence of the aircraft directly.

4 Claims, 2 Drawing Sheets

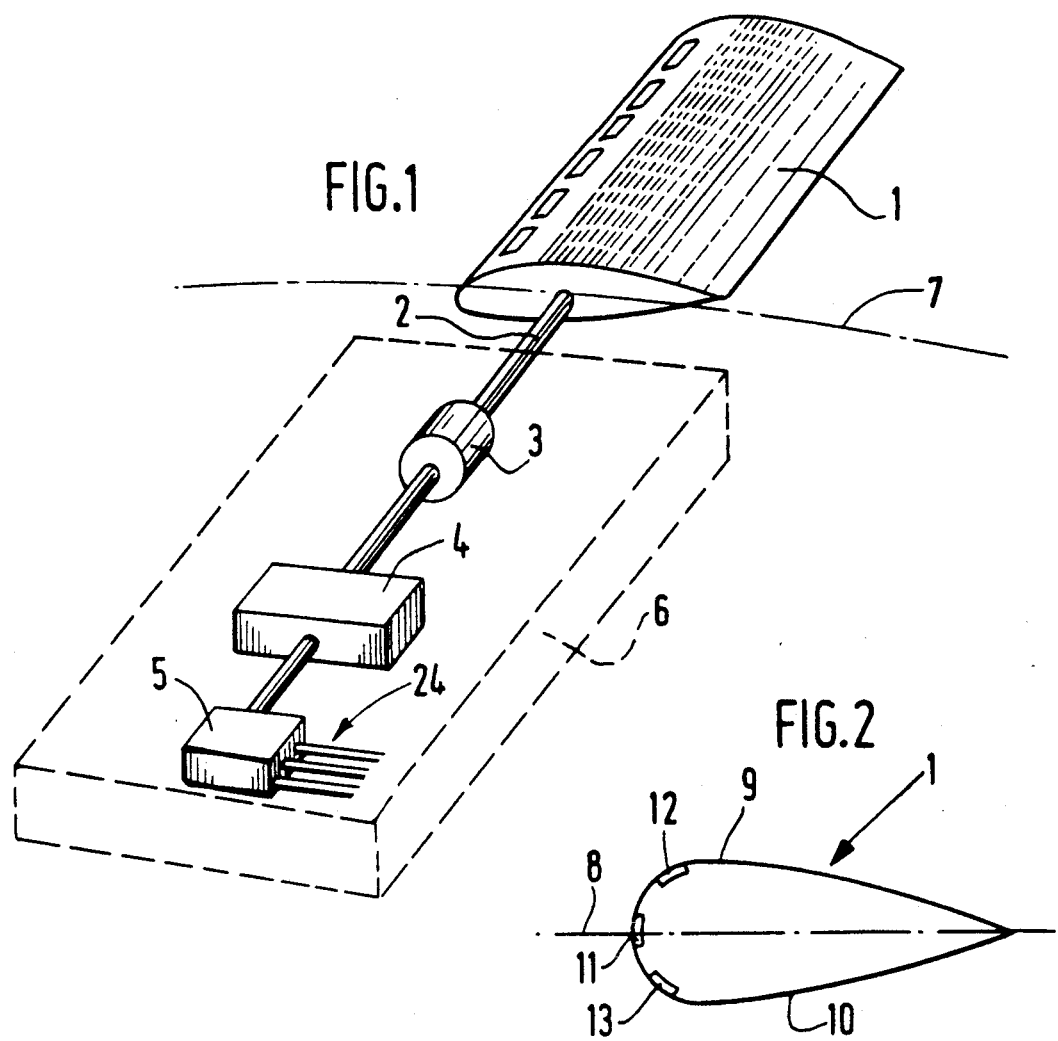
FIG.1
FIG.2
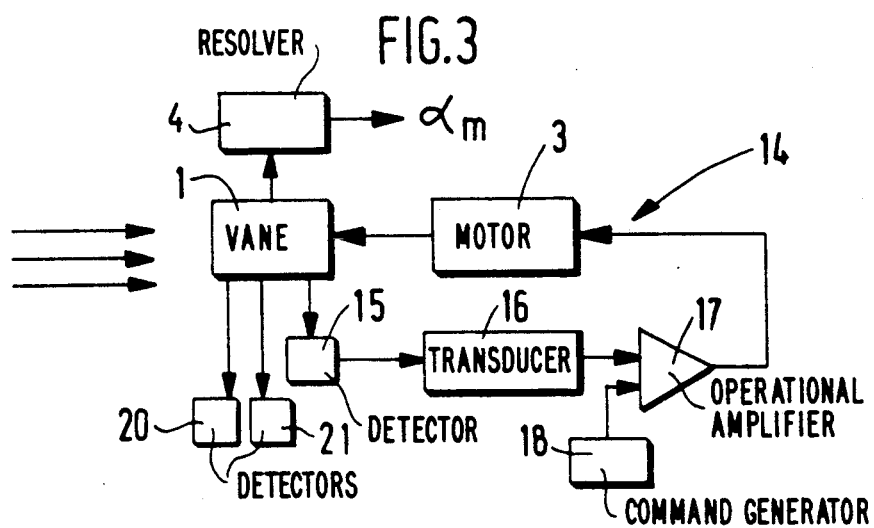
FIG.3

AIRCRAFT PROBE FOR MEASURING AERODYNAMIC PARAMETERS OF AMBIENT FLOW

BACKGROUND OF THE INVENTION

1. Field of the Invention

The present invention relates to an aircraft probe for measuring aerodynamic parameters of the ambient flow of the aircraft, comprising a wind vane mounted for rotation on the aircraft which is adapted to align itself in the direction of the flow and is provided with means for detection of differential pressure representative of the aerodynamic incidence of the wind vane, and means for determining the direction of the wind vane with respect to the aircraft.

2. Description of Related Art

The piloting of any aircraft involves knowing its relative speed with respect to the air, that is to say to the relative wind. This speed is determined by means of detectors of the static pressure po, of the total pressure pt, of the angle of incidence $\alpha$ and of the angle of sideslip $\beta$. $\alpha$ and $\beta$ supply the direction of the velocity vector in a reference or referential system related to the aircraft and pt - po supplies the module of this speed vector. The four aerodynamic parameters, therefore, make it possible to determine the velocity vector of an airplane and, subsidiarily, of an aircraft with convertible rotor.

A probe of the above-mentioned type is already known from EP-A-O 176 405. It has the advantage of assuring several functions and of thus avoiding an excessive multiplicity of detectors which would be fragile, the maintenance of which would have to be assured and which would consume de-icing energy. It also has the advantage over static multi-functional probes with fixed antenna, for instance of the type described in U.S. Pat. No. 4,096,744, of offering relatively good precision, particularly at large angles of incidence.

In fact, the wind vane of the prior-art probe is subjected not only to the aerodynamic torque produced by the relative wind, but also to a frictional torque acting on its shaft, so that it does not orient itself precisely in the direction of the flow. In other words, the aerodynamic angle of incidence of the wind vane, that is to say the angle formed between the direction of flow and the plane of the wind vane, is not zero.

EP-A-0 176 405 teaches determining the angle of incidence of the wind vane by the differential pressure measurement and calculating the sum of this angle of incidence and the relative orientation of the wind vane with respect to the aircraft in order to obtain the true angle of incidence of the aircraft.

As a result, the operation of the probe of said publication, which, therefore, employs calculating means, is not the simplest and is rather expensive. This is a drawback for subsonic civilian planes.

SUMMARY OF THE INVENTION

The present invention is directed at overcoming this drawback.

For this purpose, it concerns a probe of the type mentioned above, characterized by the fact that it comprises means adapted to cancel out the aerodynamic incidence of the wind vane.

The importance of the invention results from the fact that, the angle of incidence of the wind vane being zero, the relative orientation of the wind vane with respect to the aircraft directly supplies the true angle of incidence of the aircraft. It is no longer necessary to effect any calculation whatsoever.

The invention is characterized by the fact that while more and more powerful and precise means of calculation are available, the applicant has, on the contrary, sought to do without any means of calculation.

In the preferred embodiment of the probe of the invention, the means for cancelling out the angle of incidence of the wind vane are controlled by the differential pressure detection means.

The differential pressure detection means advantageously control a control loop adapted to exert a drive torque on the wind vane intended to oppose the friction torque.

Furthermore, the wind vane being provided with a total pressure detector and a static pressure detector, the means for cancelling out the angle of incidence of the wind vane are preferably controlled both by the differential pressure detection means and by the total pressure and static pressure detection means in order to be independent of the speed of the plane.

BRIEF DESCRIPTION OF THE DRAWINGS

The invention will be more clearly understood from the following description of the preferred embodiments of the probe of the invention, read with reference to the accompanying drawing, in which FIG. 1 is a diagrammatic view in perspective in plan view of the wind vane and of the processing housing of the probe;

FIG. 2 is a sectional view through the wind vane;

FIG. 3 is a diagram of the control loop of the wind vane;

DETAILED DESCRIPTION OF THE PREFERRED EMBODIMENT

Figure 4:
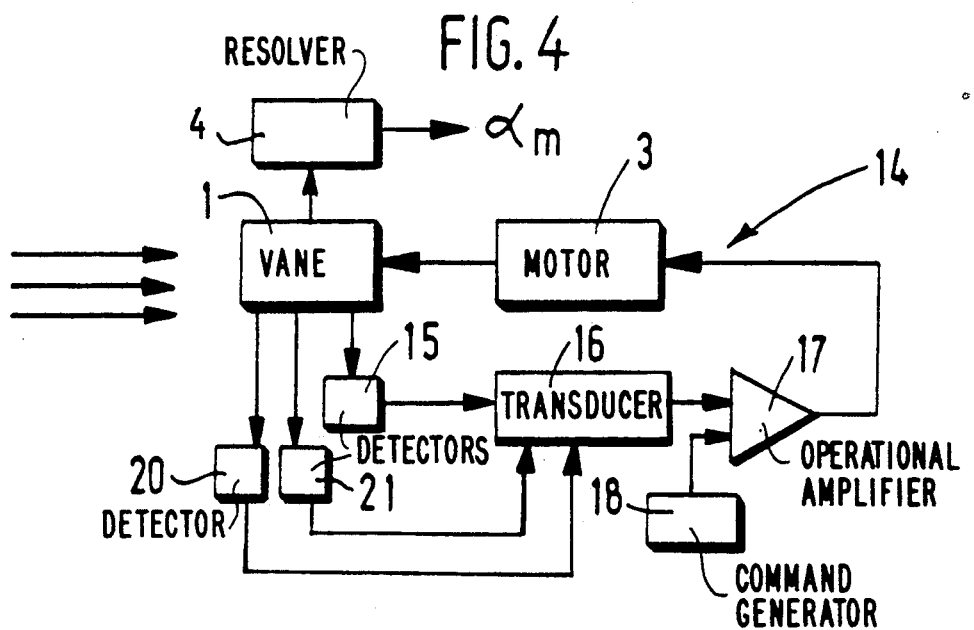
FIG. 4 is a diagram analogous to FIG. 3 of another control loop.

The probe, FIG. 1, which in this case is multifunctional, comprises a wind vane 1 mounted on a shaft 2 bearing a servomotor 3. The shaft 2 is rotatably connected with a member 4, for copying the angular position and it bears a pneumatic joint 5 intended to transmit the pressures noted on the wind vane to the processing equipment 14. All of these elements are contained within a housing 6, arranged on this side of the skin 7 of the aircraft within the latter, the wind vane 1 extending beyond the skin 7 but practically against it, with its shaft 2 substantially perpendicular to the plane of symmetry of the aircraft.

The wind vane 1 is formed of a cylindrical wing having a plane of symmetry 8 separating the extrados 9 from the intrados 10. In the present case, the profile of the wing, perpendicular to the shaft 2, is of the OOZT type of the N.A.C.A. However, this does not constitute a limitation of the invention. The wing 1 has pressure detectors formed here of calibrated orifices provided in the wing and aligned along three generatrices of the cylinder of the wing. A first series of orifices 11, which detect the total pressure, extend in the plane of symmetry 8. A second series of extrados orifices 12 and a third series of intrados orifices 13 extend respectively along two symmetrical generatrices with reference to the plane 8 and make it possible to establish the static pressure. The pressure detection orifices of the three generatrices debouch respectively, into three common collector tubes 24, which pass through the shaft 2 of the probe and the pneumatic joint 5.

With respect to these pressure detection orifices, a few remarks, although unnecessary for the person skilled in the art, may nevertheless serve to enlighten the reader.

Strictly speaking, one orifice per generatrix could be sufficient. An entire series of them is provided as a precautionary measure. One of the two series of extrados and intrados orifices could also be sufficient in order to obtain the static pressure. It is preferred to establish the average of the two. The generatrices are not located at random. It is known to place them on a cylinder of circular cross section. On the cylinder of the wing of the probe of the invention, it is more difficult. In fact, for each of the two extrados and intrados generatrices, there is sought that one for which the derivative of the pressure supplied with respect to the lateral spacing is practically zero.

The shaft 2 of the wind vane 1 is naturally subjected to a frictional torque Cf which, in the absence of servocontrol, prevents the wind vane 1 from directing itself in the direction of the air flow. In other words, it forms an angle i with the plane of symmetry 8 of the wind vane. In the case of an angle of incidence i of the wind vane, the aerodynamic torque Ca which acts on it is given by the formula $$C_a = K V^2 i$$

in which
K is a constant,
V is the conventional speed, that is to say the relative speed of the air referred to sea level,
$K V^2$ is the stiffness of the wind vane.

In the equilibrium position of the wind vane, with angle of incidence i and still in the absence of servocontrol $$Cf = Ca$$

$$i = \frac{Cf}{KV^2}$$

The difference $\Delta p$ between the two pressures supplied for the extrados orifices 12 and intrados orifices 13 is proportional to the angle of incidence i of the wind vane. The orifices 12, 13, therefore, constitute means for detection of differential pressure representative of the aerodynamic angle of incidence of the wind vane, which feed a detector 15.

Rather than determining this angle of incidence i, the invention cancels it out so that the relative orientation of the wind vane directly supplies the angle of incidence of the aircraft.

This cancellation is effected by means of the motor 3 and the control loop 14 in which it is inserted.

The motor 3 can be a DC or AC motor. It is placed on the shaft 2 of the wind vane 1 without frictional contact in order not to increase the frictional torque Cf and decrease the reliability of the probe. The motor 3 contributes a supplementary or correction torque Cm for the aerodynamic torque Ca, the sum of which is equal to the frictional torque Cf $$Cf = Cm + Ca$$
$$= Cm + KV^2 i$$

-continued $$i = \frac{Cf - Cm}{KV^2}$$

This driving torque Cm is determined by the control loop 14, the error signal of which is the output signal of the detector 15, so that the drive torque Cm is equal to the frictional torque Cf and the angle of incidence i of the wind vane is cancelled out.

The output of the detector 15 is connected to the input of an electric transducer 16 the output of which is connected to one of the two inputs of an operational amplifier 17, the other input of which is connected to a command generator 18. The command in the present case is 0 since the servocontrol is directed at cancelling i and, therefore, $\Delta p$. The output of the amplifier 17 feeds the motor 3. The member 14 for the copying of the angular position of the shaft 2, for instance a resolver, directly supplies the true angle of incidence $\alpha m$ of the aircraft.

Actually, the differential pressure $\Delta p$ depends not only on the angle of incidence i of the wind vane, but also on the conventional velocity V, in accordance with the relationship $$\Delta p = k(\tfrac{1}{2} \rho V^2) i$$

in which k is a constant and $\rho$ the density of the air. In the subsonic range, V may vary considerably in a ratio on the order of 10, resulting in a variation of $\Delta p$ in a ratio on the order of 100.

If the error signal of the control loop 14 is $\Delta p$, it is then necessary to provide said loop with a device for control of the variable gain with the velocity. In order to become independent of this variable gain, it is preferred to adopt a different error signal. The collectors of the extrados orifices 12 and intrados orifices 13 feed a detector 20 of the static pressure $p_s$ and the collector of the orifices 11, in the plane of symmetry 8 of the wind vane, feeds a detector 21 of total pressure $p_t$.

The dynamic pressure $P_t - P_s$ is given by the relationship $$p_t - p_s = \tfrac{1}{2} \rho V^2$$

As a result $$\frac{\Delta p}{p_t - p_s} = ki$$

By substituting for the signal of the differential pressure, detector 15, the signal $$\frac{\Delta p}{p_t - p_s}$$

as error signal of the control loop, thus controlled by the detectors 15, 20, 21, as shown in FIG. 4, one therefore becomes independent of the velocity V.

The probe of the invention is, therefore, particularly well-suited for use as multifunctional probe in the subsonic range.

We claim:

1. An arrangement for measuring aerodynamic parameters of an airstream moving at a velocity relative to an aircraft in the airstream, comprising:

(a) a probe mounted on the aircraft for pivoting movement about a pivot axis crosswise of the airstream, said probe extending longitudinally along the airstream between leading and trailing regions and being symmetrical about a longitudinal reference plane in which the pivot axis lies, said probe being exposed to an aerodynamic torque exerted by the airstream;

(b) an electrical motor mounted on the aircraft and having a drive shaft extending along the pivot axis and connected to the probe, said shaft being exposed to a frictional torque exerted by the airstream;

(c) differential pressure sensor means on the leading region of the probe at opposite sides of the reference plane, for detecting a differential pressure exerted by the airstream on the probe, said differential pressure being representative of the angle of incidence of the air-stream relative to the reference plane of the probe;

(d) static pressure sensor means connected to the differential pressure sensor means, for generating a static pressure;

(e) total pressure sensor means on the leading region of the probe at the reference plane, for generating a total pressure; and (f) control means operatively connected to the probe and the motor, and operative in response to the differential pressure sensor means, the static pressure sensor means and the total pressure sensor means, for moving the probe, substantially independently of the velocity of the airstream, to a null position in which the angle of incidence is zero by driving the drive shaft with a correction torque that compensates for both the aerodynamic torque and the frictional torque.

2. The arrangement of claim 1, and further comprising resolver means operatively connected to the drive shaft for determining angular position of the drive shaft and, in turn, the inclination of the probe relative to the airstream.

3. The arrangement of claim 1, wherein the control means includes a transducer means for converting the differential pressure, the static pressure and the total pressure to a first electrical signal; comparator means having a first input to which the first signal is applied, and a second input; command generator means for applying a second electrical signal to the second input; said comparator means having a comparator output connected to the motor.

4. The arrangement of claim 3, wherein the second electrical signal is a zero signal.

* * * * *